United States Patent
Lin et al.

(10) Patent No.: US 9,082,409 B2
(45) Date of Patent: Jul. 14, 2015

(54) BINARY-CACHING FOR XML DOCUMENTS WITH EMBEDDED EXECUTABLE CODE

(75) Inventors: Lin Lin, Belleville (CA); Ping Lin, Belleville (CA)

(73) Assignee: Avaya Inc., Basking Ridge, NJ (US)

( * ) Notice: Subject to any disclaimer, the term of this patent is extended or adjusted under 35 U.S.C. 154(b) by 1755 days.

(21) Appl. No.: 12/200,384

(22) Filed: Aug. 28, 2008

(65) Prior Publication Data

US 2010/0057468 A1    Mar. 4, 2010

(51) Int. Cl.
G10L 21/00 (2013.01)
G10L 25/00 (2013.01)
G06F 17/00 (2006.01)
G06F 17/20 (2006.01)
G06F 3/00 (2006.01)
G06F 17/21 (2006.01)
G06F 17/22 (2006.01)
G06F 17/24 (2006.01)
G06F 17/25 (2006.01)
G06F 17/26 (2006.01)
G06F 17/27 (2006.01)
G06F 17/28 (2006.01)

(52) U.S. Cl.
CPC .............. *G10L 21/00* (2013.01); *G06F 17/00* (2013.01)

(58) Field of Classification Search
USPC ...................................... 704/9, 275
See application file for complete search history.

(56) References Cited

U.S. PATENT DOCUMENTS

| | | | | |
|---|---|---|---|---|
| 6,012,098 A * | 1/2000 | Bayeh et al. | | 709/246 |
| 6,981,212 B1 * | 12/2005 | Claussen et al. | | 715/205 |
| 7,028,306 B2 * | 4/2006 | Boloker et al. | | 719/310 |
| 7,058,695 B2 * | 6/2006 | Takagi et al. | | 709/217 |
| 7,380,206 B1 * | 5/2008 | Usuda | | 715/236 |
| 7,380,242 B2 * | 5/2008 | Alaluf | | 717/148 |
| 7,590,644 B2 * | 9/2009 | Matsakis et al. | | 1/1 |
| 7,958,442 B2 * | 6/2011 | Olsen et al. | | 715/205 |
| 8,010,891 B2 * | 8/2011 | Kuznetsov et al. | | 715/237 |
| 8,639,515 B2 * | 1/2014 | Muschett et al. | | 704/275 |
| 2001/0047394 A1 * | 11/2001 | Kloba et al. | | 709/217 |
| 2002/0069192 A1 * | 6/2002 | Aegerter | | 707/1 |
| 2002/0112078 A1 * | 8/2002 | Yach | | 709/246 |
| 2003/0233486 A1 * | 12/2003 | Creamer et al. | | 709/318 |
| 2004/0123236 A1 * | 6/2004 | Cheung | | 715/513 |
| 2005/0273772 A1 * | 12/2005 | Matsakis et al. | | 717/136 |
| 2006/0259592 A1 * | 11/2006 | Angeline | | 709/219 |
| 2007/0288853 A1 * | 12/2007 | Neil | | 715/760 |
| 2010/0005527 A1 * | 1/2010 | Jeon | | 726/22 |

* cited by examiner

*Primary Examiner* — Olujimi Adesanya
(74) *Attorney, Agent, or Firm* — Christopher & Weisberg, P.A.

(57) ABSTRACT

A method, system and voice browser execute voice applications to perform a voice-based function. A document is retrieved and parsed to create a parse tree. Script code is created from the parse tree, thereby consuming part of the parse tree to create a reduced parse tree. The reduced parse tree is stored in a cache for subsequent execution to perform the voice-based function.

15 Claims, 3 Drawing Sheets

BINARY-CACHING FOR XML DOCUMENTS WITH EMBEDDED EXECUTABLE CODE

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to a method, system and voice browser for improving the efficiency of voice applications and more specifically to a method, system and voice browser for caching and sharing binary representations of XML documents having embedded code, such as JavaScript, across multiple channels.

BACKGROUND OF THE INVENTION

There are many commercial Voice eXtensible Markup Language ("VoiceXML" or "VXML") applications which perform voice-based functions, processing millions of telephone calls every day. A few examples of these applications include voice-based functions such as order inquiry, package tracking, driving directions, emergency notification, wake-up calls, flight tracking, voice access to email, customer relationship management, prescription refilling, audio newsmagazines, voice dialing, real-estate information, directory assistance applications, etc.

Web browsers retrieve and execute documents written in HyperText Markup Language ("HTML") and JavaScript. Some web browsers improve download time for web pages by caching an entire HTML document. The next time that document is requested, the web browser is able to retrieve the document from a local memory cache without having to retrieve the document across a network. However, web browsers only cache the original document, not the results of any intermediate processing steps.

Voice application engines operate in a similar manner as web browsers. Voice application engines retrieve and execute documents from a web server which are written in VoiceXML, Call Control XML ("CCXML"), or State Chart XML ("SCXML") and contain embedded code, such as JavaScript.

Inside a voice application engine, the XML document is parsed into a binary representation based on a tree data structure. In addition to the JavaScript code that is embedded in the document, the engine may generate additional JavaScript code, consuming part of the tree in the process. A JavaScript interpreter translates the JavaScript code into binary instructions for a virtual machine known as bytecodes. Under typical usage patterns for a voice application engine, multiple channels may be simultaneously accessing the same document. Each channel creates an XML parse tree and processes the JavaScript into bytecodes upon execution.

These hybrid XML/JavaScript documents are currently a favored method of implementing voice applications because they are relatively easy to create. However, in comparison to applications written in C++ and compiled into directly-executable binaries, the XML/JavaScript applications run slowly and exhibit lower channel densities. Therefore, what is needed is a system and method for improving the efficiency and access time of voice applications.

SUMMARY OF THE INVENTION

The present invention advantageously provides a method, system and voice browser for executing XML-based voice applications to perform a voice-based function. Generally, the present invention advantageously provides a method for improving the efficiency of voice applications by storing the processed bytecode corresponding to specific XML-based documents in a memory cache. Subsequently, multiple communications channels may access and execute the cached bytecode without having to process the document.

One aspect of the present invention provides a method for executing voice applications to perform a voice-based function. A document is retrieved and parsed to create a parse tree. Script code is created from the parse tree, thereby consuming part of the parse tree to create a reduced parse tree. The reduced parse tree is stored in a cache for subsequent execution to perform the voice-based function.

In accordance with another aspect of the present invention, a voice browser is provided for executing voice applications to perform a voice-based function. The voice browser includes a communication interface, a processor, and a memory. The processor is communicatively coupled to the communication interface and the memory. The communication interface is operable to retrieve a document. The processor is operable to parse the document to create a parse tree, create script code from the parse tree, thereby consuming part of the parse tree to create a reduced parse tree, and translate the script code to bytecode segments. The memory stores the reduced parse tree and the bytecode segments in a cache for subsequent execution to perform the voice-based function.

In accordance with yet another aspect of the present invention, a system for executing XML-based voice applications to perform a voice-based function includes at least one communication device and a voice browser. The voice browser is communicatively coupled to the at least one communication device. The voice browser is operable to retrieve an eXtensible Markup Language ("XML")-based document and parse the XML-based document to create a parse tree. The voice browser is further operable to create script code from the parse tree, thereby consuming part of the parse tree to create a reduced parse tree, translate the parse tree to bytecode segments, and store the reduced parse tree and the bytecode segments in a cache for subsequent execution to perform the voice-based function.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
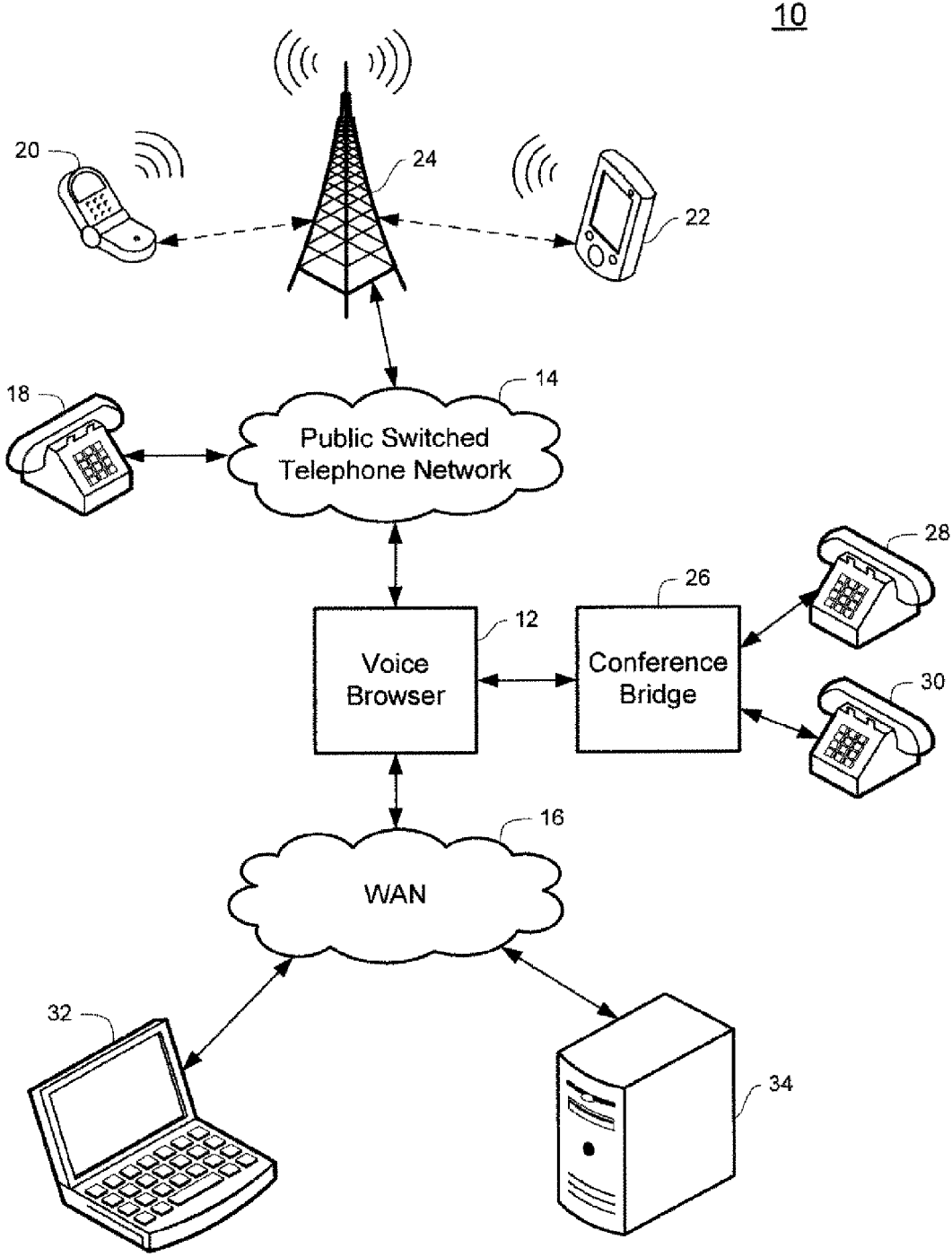
FIG. 1 is a block diagram of an exemplary voice application system constructed in accordance with the principles of the present invention.

Before describing in detail exemplary embodiments that are in accordance with the present invention, it is noted that the embodiments reside primarily in combinations of apparatus components and processing steps related to implementing a system and method for improving the efficiency of voice applications written in an XML-based language with embedded JavaScript code. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a method and system for improving the efficiency and performance of voice applications written in an XML-based language, such as VXML, CCXML, and/or SCXML, which contain embedded JavaScript code. The bytecodes generated by the JavaScript interpreter for a particular document, as well as the XML parse tree, may be cached and shared across multiple channels. VoiceXML, CCXML, and SCXML as currently defined, only use JavaScript. But in principle other scripting languages can be embedded. From the point of view of the current invention, the only requirement is that the scripting language engine provides a "compile" service that translates source to bytecode and an "execution" service by which segments of bytecode can be submitted to the virtual machine.

Referring now to the drawing figures in which like reference designators refer to like elements, there is shown in FIG. 1 an exemplary communication system 10 for improving the efficiency of voice applications constructed in accordance with the principles of the present invention. The communication system 10 includes a voice browser 12 communicatively coupled to a Public Switched Telephone Network ("PSTN") 14 and to a wide-area network ("WAN") 16. The PSTN 14 routes telephone calls between communication devices such as land-line connected telephones 18 (one shown) and/or mobile communication devices, such as mobile telephones 20 and personal digital assistants ("PDAs") 22 in a well-known manner. The PSTN 14 may communicate with mobile communication devices via one or more cellular base stations 24. Telephone calls can come in through both the PSTN 14 and the WAN 16. The latter is by now a very common scenario in enterprises.

Applicable communication devices may include a wired or wireless communication device such as a telephone, a cellular phone, a smart phone, a portable data assistant, a laptop computer, a desktop computer, or any other device commonly receiving data packets through a cellular base station 24 or PSTN 14.

The wide area network 16 may include the Internet, intranet, or other communication network. Although the communication network is pictured in FIG. 1 as being a WAN, the principles of the present invention may also apply to other forms of communication networks, such as personal area networks ("PANs"), local area networks ("LANs"), campus area networks ("CANs"), metropolitan area networks ("MANs"), etc., such as the Internet or an intranet.

For certain voice applications, the voice browser 12 may also be communicatively coupled to a conference bridge 26 for coordinating conference calls among a plurality of telephones 28, 30 (two shown) or other communication devices. The PSTN 14 connects phones 18 to the conference bridge 26 in much the same way that it connects phones 18 to each other. Additionally, the voice browser 12 may be indirectly coupled to the conference bridge 26 through the WAN 16. Alternatively, the voice browser 12 itself may function as a connection bridge 26.

In one embodiment, the voice browser 12 may be communicatively coupled to a variety of client computers 32 (one shown) and/or servers, such as application server 34. The voice browser 12 may retrieve VXML documents from the application server 34 and execute these documents in accordance with the principles of the present invention.

Figure 2:
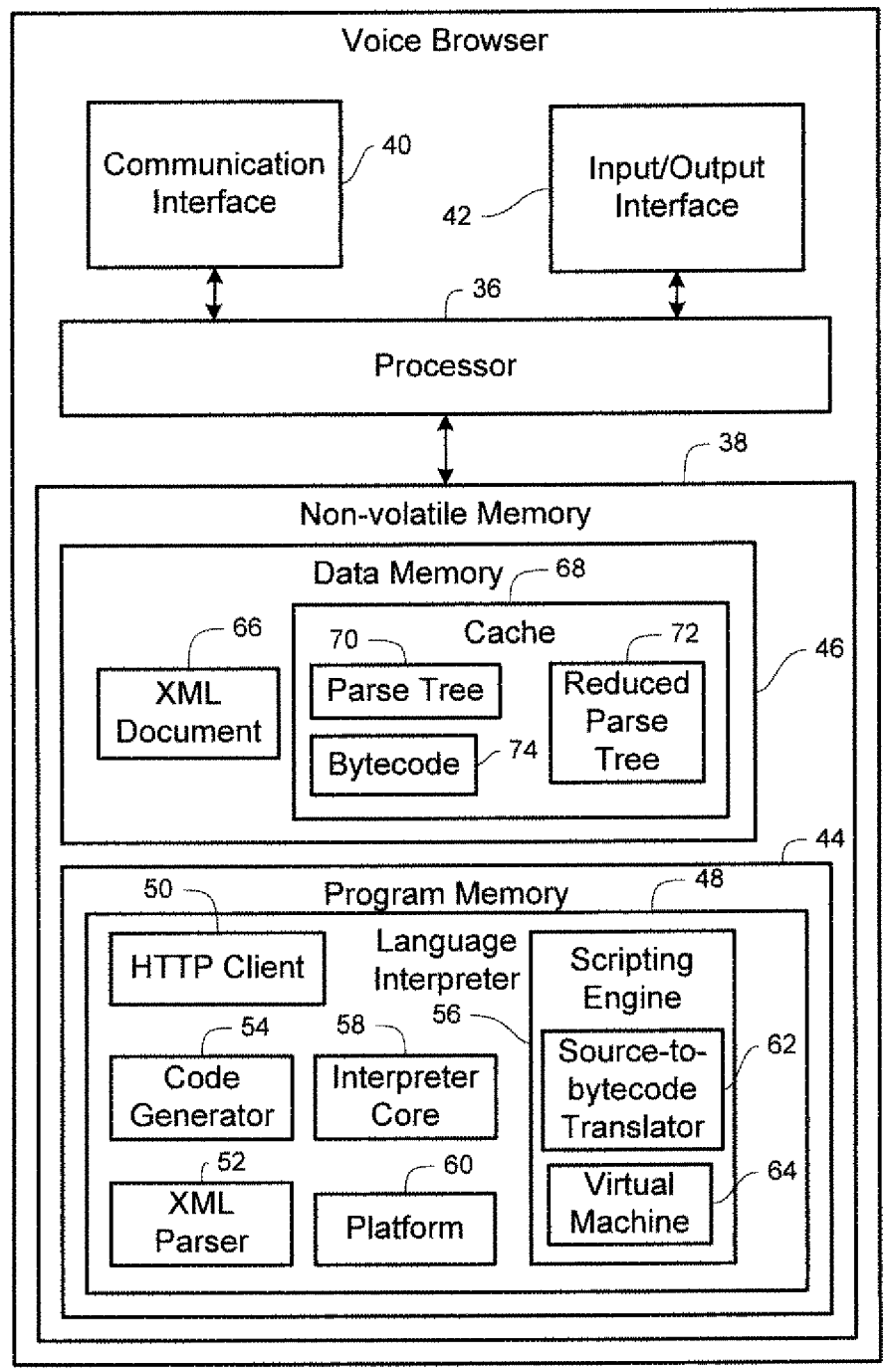
FIG. 2 is a block diagram of an exemplary voice browser constructed in accordance with the principles of the present invention.

Referring now to FIG. 2, an exemplary voice browser 12 is used to process and execute XML-based documents, such as VXML, CCXML and/or SCXML, having embedded JavaScript commands. The voice browser 12 may include a processor 36 communicatively coupled to at least a non-volatile memory 38, at least one communication interface 40 and an input/output interface 42. The processor 36 supervises and performs the various functions of the voice browser 12 in a well-known manner. The communication interface 40 may be a modem, a wired or wireless network card, or any combination thereof. The communication interface 40 transfers data packets between the voice browser 12, the PSTN 14, the WAN 16, the conference bridge 26, and optionally, other servers, client computers and communication devices using known communication protocols, e.g., Ethernet, Wi-Fi, etc. The input/output interface 42 controls the reception and presentation of information to and from a user.

The non-volatile memory 38 includes a program memory 44 and a data memory 46. Examples of non-volatile memory include, but are not limited to, a hard drive, a memory stick, an Electrically Erasable Programmable Read-Only Memory ("EEPROM"), a flash memory, a CD-ROM, a DVD, etc. Additionally, instead of or in addition to non-volatile memory, the data memory 46 may be included as some form of volatile memory, e.g., RAM.

The program memory 44 includes at least one language interpreter 48 for translating and executing a document written in a specific computer language, e.g., VoiceXML, CCXML, SCXML, etc. A language interpreter 48 for each of these languages includes an HTTP client 50, an XML parser 52, a code generator 54, a scripting engine 56, an interpreter core 58, and a platform 60. The scripting engine 56 includes a source-to-bytecode translator 62 and a virtual machine 64 for executing bytecode.

The data memory 46 includes an XML document 66 with embedded script code that has been fetched from a web server through the integrated HTTP client 50. The data memory 46 may also include a cache 68, which stores a parse tree 70, possibly a reduced parse tree 72, and bytecode segments 74.

The XML document 66 is converted into a parse tree 70 by the XML parser 52. A code generator 54 may create additional script code from the parse tree 70, consuming part of the parse tree 70 in the process. This reduced parse tree 72 is saved in the cache 68. Script code, both embedded and generated, is translated into bytecode 74 by the scripting engine 56. A unit of script code that can be independently submitted to the scripting engine for execution is translated into a bytecode segment 74. Bytecode segments 74 are saved in the cache 68. In particular, they are attached to the parse tree 70 in such a way as to match the location within the XML document 66 of the script code from which they arose.

The interpreter core 58 implements the semantics of VoiceXML/CCXML/SCXML. The interpreter core 58 receives external stimuli in the form of events from the platform 60. Based on the contents of the XML document 66 under execution, the interpreter core 58 formulates commands to the platform 60. The interpreter core 58 works off the reduced parse tree 72 in the cache 68, and submits bytecode segments 74 to the virtual machine 64 inside the scripting engine 56.

As an example, in CCXML, the platform 60 might be software that implements the Session Initiation Protocol ("SIP"), the standard signaling protocol for Voice-over-Internet Protocol ("VoIP"). An event might indicate an incoming call. Commands may be to accept or reject the call.

As another example, in VoiceXML, the platform 60 might consist of speech recognition and text-to-speech engines. Events might consist of dual-tone multi-frequency ("DTMF") digits from the telephone keypad or recognition results on spoken utterances. Commands may include playing pre-recorded prompts or a piece of text.

Figure 3:
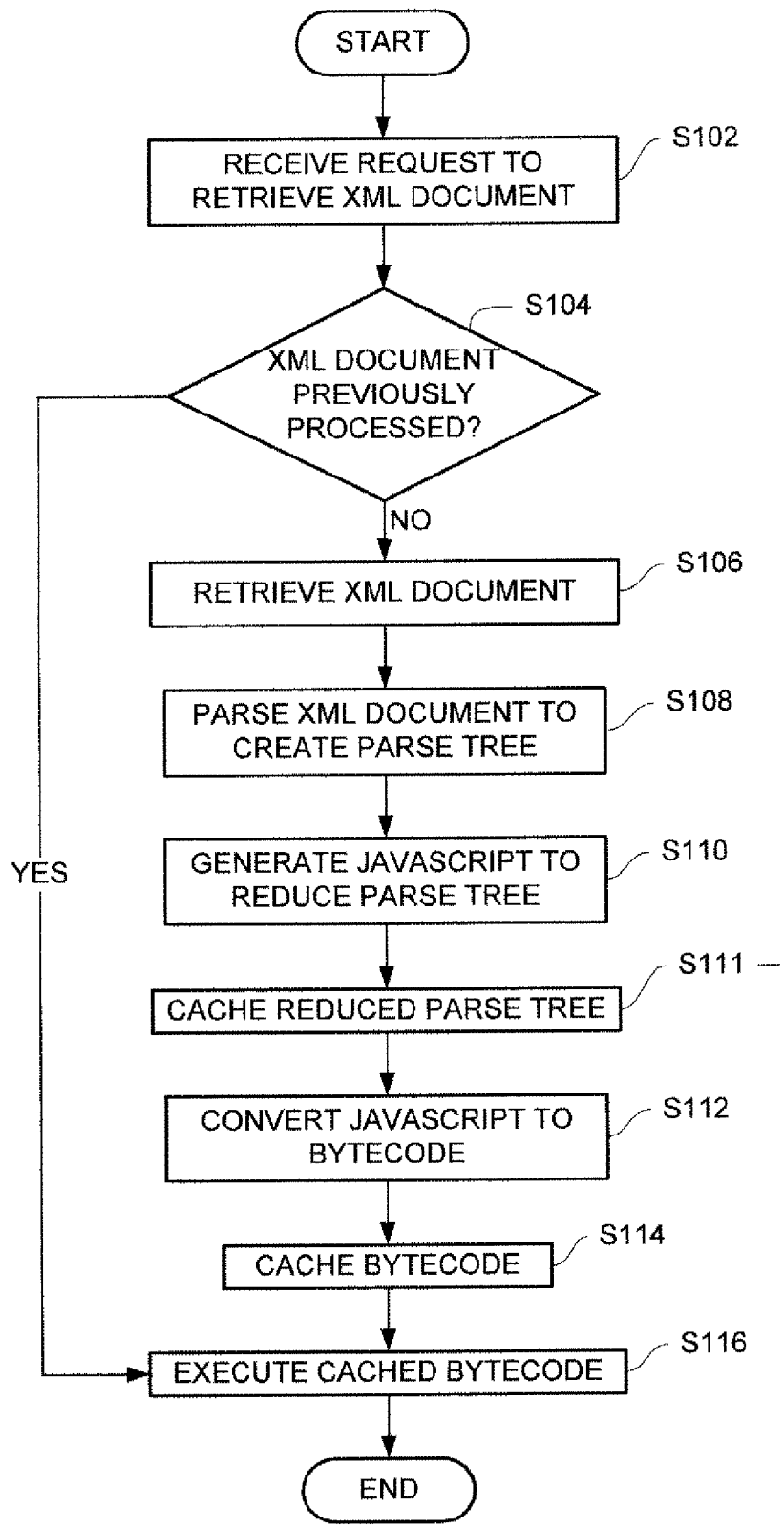
FIG. 3 is a flowchart of an exemplary voice application compilation process according to the principles of the present invention.

FIG. 3 provides an exemplary operational flowchart that describes steps performed by a voice browser for improving the efficiency of XML-based voice applications having embedded JavaScript commands. The voice browser 12 receives a request to retrieve a particular XML document (step S102). If the voice browser has not previously processed this XML document (step S104), the voice browser 12 retrieves the requested XML document 66 (step S106). The XML document may contain embedded JavaScript commands. Generally, the XML document is received from a web server in a similar manner as a web browser receives a web page.

The XML parser 52 parses the XML document 66 to create a parse tree 70 (step S108). The parse tree 70 is reduced by generating JavaScript for appropriate components (step S110). The reduced parse tree 72 is cached (step S111). The source-to-bytecode translator 62 translates the JavaScript code into bytecode which actually provides the instructions for the virtual machine 64 (step S112). The JavaScript code may either be generated or embedded in the original document. This bytecode is cached for future use and shared across a plurality of communication channels (step S114). The bytecode is then executed to perform its desired function (step S116). Returning to decision block S104, if the requested XML document has previously been processed, then a copy of the bytecode for this document is already cached in memory. Thus, the voice browser is able to bypass all the above processing steps and simply executes the cached bytecode (step S116).

Please note that whereas the complete parse tree 70 must be produced all at once, bytecode segments 74 can be attached to the tree piecemeal ("lazy translation"), as the corresponding script code is encountered during document execution. This is a further optimization because, in many documents, there might be one main path through the code and many error paths that are hardly ever touched.

As an example of one embodiment of the present invention, consider the following original CCXML document of Table 1.

TABLE 1

Original CCXML Document

```
<ccxml version="1.0">
<var name="confid"/>
<var name="confok" expr="false"/>
<eventprocessor>
    <transition event="ccxml.loaded">
        <createconference
confname="'sip://bridge.nortel.com'"
```

TABLE 1-continued

Original CCXML Document

```
conferenceid="confid"/>
    </transition>
    <transition event="conference.created">
        <assign name="confok" expr="true"/>
    </transition>
    <transition event="connection.alerting"
cond="session.values.participants.indexOf(event$.connection.
originator)!=-1">
        <accept connectionid="event$.connectionid"/>
    </transition>
    <transition event="connection.connected" cond="confok">
        <join id1="confid" id2="event$.connectionid"/>
    </transition>
</eventprocessor>
</ccxml>
```

The CCXML document of Table 1 accepts an argument containing a list of people to be allowed to join in as a participant in a conference call. When a caller dials in to an assigned phone number, the voice browser 12 determines whether the caller is on the approved list and, if so, connects the incoming call. However, in order for the voice browser 12 to actually process the above CCXML document, it must first parse the document into a useable form. An example of a parsed document is shown in Table 2 as a parse tree 70.

TABLE 2

Parse Tree

```
CCXML
    VERSION 1.0
    VAR
        NAME confid
    VAR
        NAME confok
        EXPR false
    EVENTPROCESSOR
        TRANSITION
            EVENT ccxml.loaded
            CREATECONFERENCE
                CONFNAME 'sip://bridge.nortel.com'
                CONFERENCEID confid
        TRANSITION
            EVENT conference.created
            ASSIGN
                NAME confok
                EXPR true
        TRANSITION
            EVENT connection.alerting
            COND
session.values.participants.indexOf(event$.connection.-
originator)!=-1
            ACCEPT
                CONNECTIONID event$.connectionid
        TRANSITION
            EVENT connection.connected
            COND confok
            JOIN
                ID1 confid
                ID2 event$.connectionid
```

The format of the parse tree of Table 2 includes a plurality of nodes which may or may not have associated child nodes. For example, the root node contains only the identifier "CCXML" which identifies the underlying language of the document for execution by a virtual machine. The tag <ccxml version="1.0"> from the original CCXML document (Table 1) is now two nodes of the parse tree. Additional tags have also been transformed to create nodes which contain child attribute nodes that include attached data. For example, a tag such as <var name="confid"> is transformed to be node VAR having a child attribute node "NAME confid" which includes the attached data "confid". Every tag of the original CCXML document is parsed in this manner to create a more simple structure for the machine to understand. Underlined nodes come from tags and nodes without underline result from attributes. Tag nodes can have other tag nodes, attribute nodes, and attached data as children. Attribute nodes can only have attached data.

Subsequently, the parse tree of Table 2 is further reduced by generating executable code, such as JavaScript code for applicable commands. An exemplary reduced parse tree is provided in Table 3. This reduced parse tree is cached for future use.

TABLE 3

Reduced Parse Tree after JavaScript Generation

CCXML
  VAR var confid
  VAR var confok=false
  EVENTPROCESSOR
    TRANSITION event$.name=='ccxml.loaded'
      CREATECONFERENCE
        CONFNAME 'sip://bridge.nortel.com'
        CONFERENCEID confid
    TRANSITION event$.name=='conference.created'
      ASSIGN confok=true
    TRANSITION
event$.name=='connection.alerting'&&session.values.participants.-indexOf(event$.connection.originator)!=-1
      ACCEPT
        CONNECTIONID event$.connectionid
    TRANSITION event$.name=='connection.connected'&&confok
      JOIN
        ID1 confid
        ID2 event$.connectionid Every piece of JavaScript attached to a node may be independently submitted to the JavaScript engine in the course of document execution.

JavaScript is an interpreted language in which high-level statements are translated into bytecodes for a virtual machine. JavaScript source under each node is converted into a bytecode segment and attached to the parse tree. The results are shown in Table 4.

TABLE 4

Reduced Parse Tree with Bytecode

CCXML
  VAR var confid
  VAR var confok=false
  EVENTPROCESSOR
    TRANSITION
      [name "event$"
      getprop "name"
      string "ccxml.loaded"
      eq
      pop]
      CREATECONFERENCE
        CONFNAME
          [string "sip://bridge.nortel.com"
          pop]
        CONFERENCEID confid
    TRANSITION
      [name "event$"
      getprop "name"
      string "conference.created"
      eq
      pop]
      ASSIGN
        [bindname "confok"
        true TABLE 4-continued Reduced Parse Tree with Bytecode setname "confok"
        pop]
    TRANSITION
      [name "event$"
      getprop "name"
      string "connection.alerting"
      eq
      and 42 (32)
      name "session"
      getprop "values"
        getprop "participants"
        getmethod "indexOf"
        pushobj
        name "event$"
        getprop "connection"
        getprop "originator"
        call 1
        number -1
        ne
        42: pop]
      ACCEPT
        CONNECTIONID
          [name "event$"
          getprop "connectionid"
          pop]
    TRANSITION
      [name "event$"
      getprop "name"
      string "connection.connected"
      eq
      and 16 (6)
      name "confok"
      16: pop]
      JOIN
        ID1
          [name "confid"
          pop]
        ID2
          [name "event$"
          getprop "connectionid"
          pop]

The low-level bytecode shown in Table 4 is an example of actual code that is executed by the virtual machine. This bytecode is cached in memory so that the same XML document does not have to be processed anew by each call and may be retained for future use. In this manner, the processing and retrieval time for the actual XML document is advantageously noticeably reduced, thereby reducing the duration of pauses or hold time that a caller may experience while using the voice application.

Continuing the above example, suppose the voice application detailed in Tables 1-4 were implemented as a conference bridge. The CCXML document of Table 1 is only processed for the first caller joining the conference call. For each subsequent caller, the existing reduced parse tree and bytecode (Table 4) which is cached in, is simply accessed and executed. No further processing is required. It should be noted that multiple callers may dial into the conference bridge substantially simultaneously using different channels. Thus, each channel may access and share the cached reduced parse tree 72 and bytecode 74 contemporaneously. It should also be noted that the above example is but one voice function application used for illustrative purposes only, and is not intended to limit the scope of the invention.

Additionally, because embodiments reduce the amount of processing resources required per channel, the number of channels that one voice browser is able to support increases. Thus, the amount of physical space required for the voice browser, as well as cooling requirements, is greatly reduced. Because the same document is typically used in many calls, if the reduced parse tree 72 and bytecode 74 are cached from the first call, a considerable amount of CPU time can be saved on subsequent calls. This leads to increased channel density on the same hardware.

For example, a prior art voice browser currently in use may support a specific number of channels. To increase the capacity of the overall communication system to handle more channels, additional individual voice browser boxes would be required. Additional overhead in the form of enabling and coordinating communication between the boxes is also incurred. Operation of these boxes generates a great deal of heat, which must be offset by additional air conditioning to maintain a proper operating temperature. However, with the improved processes of the present invention, as described above, a single voice browser box may service, for example, up to five times the number of channels as before, thereby improving the energy efficiency of the communication system and surrounding environment while also allowing the implementation of less hardware.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for executing voice applications to perform a voice-based function, the method comprising:
   receiving a first request for a document;
   retrieving the document in response to the first request;
   parsing the document to create a parse tree, the parse tree including an XML node;
   creating script code from the parse tree;
   translating the script code to bytecode segments;
   replacing the XML node with script code, thereby consuming part of the parse tree to create a reduced parse tree;
   storing the reduced parse tree in a cache for subsequent retrieval in response to a second request for the document, the reduced parse tree configured for use to perform the voice-based function;
   storing the bytecode segments in a cache for subsequent execution to perform the voice-based function
   receiving the second request to retrieve the document:
   in response to the second request, determining whether bytecode corresponding to the document is stored in a cache; and
   responsive to determining that bytecode corresponding to the document is already stored in the cache:
   bypassing the retrieving, parsing, creating, replacing, translating and storing steps associated with the second request; and
   executing the cached bytecode.

2. The method of claim 1, further comprising:
   determining that bytecode corresponding to the document is not stored in a cache.

3. The method of claim 1, wherein the cached bytecode is executed by a plurality of communication channels, each communication channel independently accessing the cached bytecode.

4. The method of claim 1, further comprising:
   in response to the second request, determining whether a reduced parse tree corresponding to the document is already stored in a cache; and
   responsive to determining that a reduced parse tree corresponding to the document is already stored in a cache:
   translating the script code to bytecode segments; and
   executing the cached bytecode segments.

5. The method of claim 1, wherein document is written in at least One of eXtensible Markup Language ("XML"), VoiceXML, Call Control XML, and State Chart XML.

6. The method of claim 1, wherein the document includes embedded executable commands.

7. The method of claim 6, wherein the executable commands are JavaScript commands.

8. The method of claim 1, further comprising storing bytecode segments in the cache as encountered during translation.

9. A voice browser for executing voice applications to perform a voice-based function, the voice browser comprising:
   a communication interface configured to:
   receive a first request for a document;
   retrieve the document in response to the first request;
   a processor communicatively coupled to the communication interface, the processor configured to:
   parse document to create a parse tree, the parse tree including an XML node;
   create script code from the parse tree;
   replace the node with script code, thereby consuming part of the parse tree to
   create a reduced parse tree; and
   translate the script code to bytecode segments;
   a memory communicatively coupled to the processor, the memory configured to store the reduced parse tree and the bytecode segments in a cache for subsequent execution in response to a second request for the document, the reduced parse tree and bytecode segments configured for execution to perform the voice-based function; and
   the processor further configured to, in response to the second request:
   determine whether bytecode corresponding to the document is stored in a cache;
   responsive to determining that bytecode corresponding to the document is already stored in the cache:
   bypass the retrieving, parsing, creating, replacing, translating and storing steps associated with the second request; and
   execute the cached bytecode.

10. The voice browser of claim 9, wherein the communication interface is configured to communicate with a plurality of communication channels, each communication channel independently executing the cached bytecode.

11. The voice browser of claim 9, wherein the document is written in at least one of eXtensible Markup Language ("XML"), VoiceXML, Call Control XML, and State Chart XML.

12. The voice browser of claim 9, wherein the document includes embedded JavaScript commands.

13. The voice browser of claim 9, the communication interface is further configured to receive the second request to retrieve the document; and
the processor is further configured to:
determine whether a reduced parse tree corresponding to tile documents is already stored in a cache;
responsive to determining that the reduced parse tree corresponding to the document is already stored in the cache, translate the script code to bytecode segments and execute the cached bytecode segments.

14. A system for executing XML-based voice applications to
perform a voice-based function, the system comprising:
at least one communication device; and
a voice browser communicatively coupled to the at least one communication device, the voice browser configured to:
receive a first request for an eXtensible Markup Language ("XML") based document;
retrieve the XML based document in response to the first request;
parse the XML-based document to create a parse tree, the parse tree including an XML node;
create script code from the parse tree;
replacing the XML node with script code, thereby consuming part of the parse tree to create a reduced parse tree;
translate the script code to bytecode segments;
store the reduced parse tree and the bytecode segments in a cache for subsequent execution in response to a second request for the XML based document, the reduced parse tree configured for execution to perform the voice-based function; and
in response to the second request:
determine whether bytecode corresponding to the document is stored in a cache; and
responsive to determining that bytecode corresponding to the document is already stored in the cache:
bypass the retrieving, parsing, creating, replacing, translating and storing steps associated with the second request; and
execute the cached bytecode.

15. The system of claim 14, further comprising a web server communicatively coupled to the voice browser, the web server configured to transmit the XML-based document.

* * * * *

UNITED STATES PATENT AND TRADEMARK OFFICE
CERTIFICATE OF CORRECTION

PATENT NO.        : 9,082,409 B2                                           Page 1 of 1
APPLICATION NO.   : 12/200384
DATED             : July 14, 2015
INVENTOR(S)       : Lin Lin and Ping Lin It is certified that error appears in the above-identified patent and that said Letters Patent is hereby corrected as shown below:

Claims

Column 10, line 27, Claim 5, replace "One" with --one--.

Column 11, line 17, Claim 13, replace "tile" with --the--.

Signed and Sealed this
Twenty-fourth Day of November, 2015

Michelle K. Lee
*Director of the United States Patent and Trademark Office*